(12) United States Patent
Stroh et al.

(10) Patent No.: US 7,004,144 B2
(45) Date of Patent: Feb. 28, 2006

(54) DYNAMICAL TORQUE CONTROL SYSTEM

(75) Inventors: David J. Stroh, Farmington Hills, MI (US); Charles H. Folkerts, Troy, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/664,346

(22) Filed: Sep. 17, 2003

(65) Prior Publication Data

US 2005/0056251 A1 Mar. 17, 2005

(51) Int. Cl.
*F02D 9/00* (2006.01)
*F02D 41/18* (2006.01)

(52) U.S. Cl. .................................. 123/399; 123/683
(58) Field of Classification Search ............... 123/399, 123/673, 674, 677, 678, 683
See application file for complete search history.

(56) References Cited

U.S. PATENT DOCUMENTS

| 4,549,517 | A | * | 10/1985 | Kamiyama ................. 123/399 |
| 4,763,264 | A | * | 8/1988 | Okuno et al. .............. 123/674 |
| 5,080,064 | A | * | 1/1992 | Buslepp et al. ............ 123/399 |
| 5,349,932 | A | * | 9/1994 | Boverie et al. ............ 123/399 |
| 5,606,951 | A | * | 3/1997 | Southern et al. ........... 123/399 |
| 6,250,292 | B1 | * | 6/2001 | Suhre ...................... 123/399 |
| 6,584,392 | B1 | * | 6/2003 | Jankovic et al. ........... 123/399 |
| 6,701,890 | B1 | * | 3/2004 | Suhre et al. .............. 123/399 |
| 6,761,146 | B1 | * | 7/2004 | Livshiz et al. ............ 123/399 |

* cited by examiner

*Primary Examiner*—Erick Solis
(74) *Attorney, Agent, or Firm*—Christopher DeVries

(57) ABSTRACT

A method of dynamically controlling torque output of a torque producing device includes determining a shaped torque command based on a torque command generated by an input device and calculating an actuator variable based on the shaped torque command and a gain. An actuator is regulated based on the actuator variable to adjust the torque output.

31 Claims, 3 Drawing Sheets

DYNAMICAL TORQUE CONTROL SYSTEM

FIELD OF THE INVENTION

The present invention relates to torque control systems for torque producers, and more particularly to torque control systems that adjust torque output of a torque producer based on a desired torque signal.

BACKGROUND OF THE INVENTION

Internal combustion engine control systems are typically steady-state, throttle-based control systems. In a steady-state control system, the torque output of the engine is related to a throttle set point. A driver adjusts a position of an accelerator pedal, which changes the throttle set point. The throttle set point controls the amount of airflow into an intake manifold and the cylinders. In other words, the torque output of the engine is related to cylinder airflow, which is based on the throttle set point. After a throttle adjustment, the engine torque eventually settles at a desired value that is related to the cylinder airflow.

Steady-state, throttle-based control systems typically have an exponential response to requested torque changes. In other words, when the accelerator pedal and the throttle are moved, the torque output of the engine adjusts in an exponential manner. The rate of torque change is related to dynamic characteristics of the intake manifold and may be too slow or fast. A slow rate of torque change leads to sluggish performance. A fast rate of torque change may cause drivability issues such as abrupt torque changes. Steady-state, throttle-based control systems may also have undesirable torque characteristics in vehicles using other power plants such as hybrids.

SUMMARY OF THE INVENTION

Accordingly, the present invention provides a method of dynamically controlling torque output of a torque producing device. The method includes determining a shaped torque command based on a torque command generated by an input device and calculating an actuator variable based on the shaped torque command and a gain. An actuator is regulated based on the actuator variable to adjust the torque output.

In one feature, the shaped torque command is further based on dynamics of said torque producing device.

In another feature, the is based on parameters affecting the said torque command.

In still another feature, the torque producing device is an engine and the actuator variable is an effective throttle area.

In one feature, the step of calculating the actuator variable includes determining a mass airflow into an intake manifold of the engine. The step of determining the mass airflow into the intake manifold includes calculating a desired mass airflow out of the intake manifold based on the desired APC.

In another feature, calculating the airflow out of the intake manifold is based on engine speed and a number of cylinders of the engine.

In another feature, the desired mass airflow out of said intake manifold is based on intake manifold volume and a number of cylinders of the engine.

In still another feature, the desired mass airflow into the intake manifold is further based on an engine response pole and an engine noise pole.

In yet another feature, the step of calculating the effective throttle area corresponding to the desired APC is based on the desired mass airflow into the intake manifold.

In another feature, the desired mass airflow into the intake manifold is based on an ambient pressure and an ambient temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application or uses.

Figure 1:
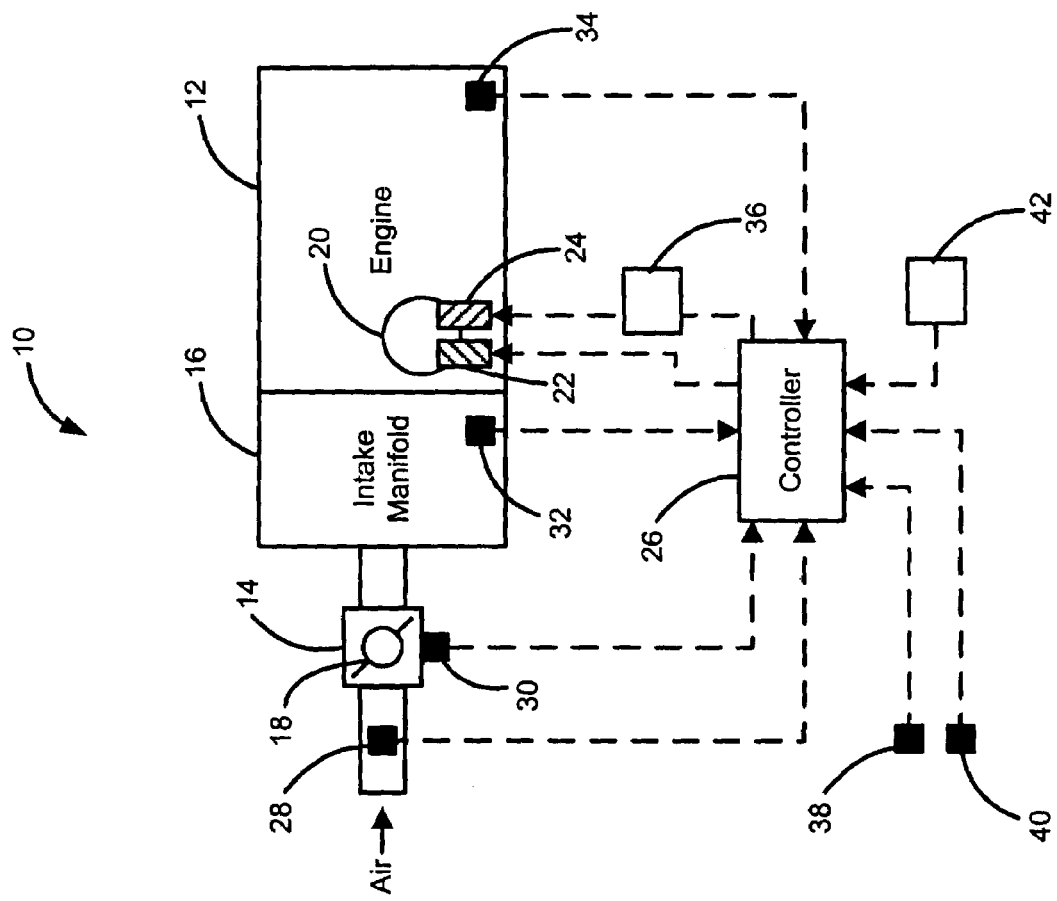
FIG. 1 is a functional block diagram of a engine control system according to the present invention.

Referring now to FIG. 1, an engine control system 10 includes an engine 12. The engine 12 includes a throttle 14 and an intake manifold 16. Air flow through the throttle 14 and into the intake manifold 16 is based on a position of a throttle plate 18. Air flows into individual cylinders 20 of the engine 12. Although only a single cylinder 20 is shown, it is appreciated that the engine 12 can include multiple cylinders 20. The cylinder 20 includes a piston (not shown) that compresses an air/fuel mixture. More specifically, air flow into the cylinder 20 is mixed with fuel injected by a fuel injector 22. A spark plug 24 ignites the compressed air/fuel mixture in a combustion process to produce engine torque.

A controller 26 controls engine torque based on the dynamic torque control of the present invention. The controller 26 adjusts the engine torque based on a requested or reference torque. The controller 26 dynamically controls a rate of torque change delivered by the engine 12 by determining an amount of air-per-cylinder (APC) for a plurality of cylinders 20 that is necessary to deliver the requested engine torque. APC is determined based on the torque command. More specifically, APC can be determined from a look-up table based on the torque command and the vehicle operating conditions or can be calculated based on an APC model.

The controller 26 communicates with a mass air flow (MAF) sensor 28, a throttle position sensor (TPS) 30, a manifold absolute pressure (MAP) sensor 32 and an engine speed sensor 34. The MAF sensor 28 generates a signal indicating the amount of air flow through the throttle 14. The TPS 30 generates a signal indicating the position of the throttle plate 18 and the MAP sensor 32 generates a signal indicating the pressure within the intake manifold 16. The engine speed sensor 34 generates a signal indicating the engine speed (RPM). The controller 26 also communicates with the fuel injector 22 to control the fuel rate provided to the cylinder 20 and an ignition system 36 to control timing of the ignition spark. Ambient air pressure and temperature signals are generated by ambient air pressure and temperature sensors 38, 40, respectively.

The controller 26 includes a processor and memory. The memory includes an electronic data storage flash memory, erasable programmable read-only memory (EPROM), electrically erasable programmable read-only memory (EEPROM), read only memory (ROM), flash memory or a one time programmable (OTP) memory. The controller 26 executes the dynamic torque control of the present invention. More specifically, the controller 26 solves equations and monitors operating parameters of the engine 12. The operating parameters of the engine 12 include air/fuel ratio, engine speed, delivered torque, spark timing, throttle position, or any other parameter.

The controller 26 receives a requested torque command from a driver input device 42 such as an accelerator pedal, a hand operated throttle control or a computer-based input device. The position of the input device 42 is interpreted as the requested torque command. The requested torque command indicates a desired torque output or a desired torque change. The controller 26 determines the APC required based on the requested torque command. The controller 26 adjusts the throttle 14 to provide the required APC to the cylinder 20.

The APC is an intermediate parameter rather than an actuating parameter. For example, actuating parameters include the throttle position, fuel rate and ignition timing. A transfer function is developed between the APC and one or more actuating parameters. Actuating parameters are operational parameters of the engine 12 that can be directly commanded. For example, spark advance, throttle position and a fuel rate are directly commanded by the controller 26. A transfer function is developed between the APC and the throttle position. Additionally, since intake manifold filling dynamics are involved between the throttle position and the APC, the transfer function accounts for intake manifold dynamics.

The transfer function correlating the APC with the throttle position incorporates a compressible flow function that relates throttle area to mass airflow across the throttle plate 18 ($\dot{m}_{throttle}$) The throttle area is defined as the area of an opening between the throttle plate 18 and the intake manifold 16. The throttle area is dependent on the angular position of the throttle plate 18. The compressible flow function is given by:

$$\dot{m}_{throttle} = A_{eff} \cdot P_{amb} \cdot \frac{\varphi}{(R \cdot T_{amb})^{\frac{1}{2}}} \quad (1)$$

where:
 $A_{eff}$ is an effective throttle flow area;
 R is a universal gas constant;
 $T_{amb}$ is an ambient air temperature; and
 $P_{amb}$ is an ambient barometric pressure.

$\varphi$ is calculated as:

$$\varphi = \left(\frac{P_{man}}{P_{amb}}\right)^{\frac{1}{\gamma}} \cdot \left[\left(\frac{2\gamma}{\gamma-1}\right) \cdot \left(1 - \left(\frac{P_{man}}{P_{amb}}\right)^{\left(\frac{\gamma-1}{\gamma}\right)}\right)\right]^{\frac{1}{2}}$$

where:
 $P_{man}$=manifold absolute pressure; and
 $\gamma$=ratio of specific heats for air.

$A_{eff}$ is directly related to the throttle position. Therefore, solving equation (1) for $A_{eff}$ provides a value from which the throttle position can be determined. $P_{amb}$ and $T_{amb}$ are constantly changing during operation of the engine 12 and are directly measured by the pressure and temperature sensors 38,40. A speed density equation is incorporated to determine $\dot{m}_v$. The speed density equation is provided as:

$$\dot{m}_v = APC \cdot N \cdot \left(\frac{C}{120}\right) \quad (2)$$

where:
 C=number of cylinders;
 N=engine speed (RPM); and
 $\dot{m}_v$=mass flow rate into the cylinders.

A dynamic model establishes the relationship between $\dot{m}_{throttle}$ and $\dot{m}_v$. A first order model is developed by using scientific principles, such as the conservation of mass and the ideal gas law. Applying the principle of conservation of mass to the intake manifold 16 gives the following equation:

$$\dot{m}_{man} = \dot{m}_{throttle} - \dot{m}_v \quad (3)$$

where:
 $\dot{m}_{man}$ is the rate of change of mass in the intake manifold.

Using the speed density equation (2), $\dot{m}_v$ can be expressed as:

$$\dot{m}_v = \eta_v \cdot V_c \cdot P_{man} \cdot N \cdot \frac{\left(\frac{C}{120}\right)}{(R \cdot T_{amb})} \quad (4)$$

where:
 $\eta_v$=volumetric efficiency of the cylinders; and
 $V_c$=volume of the cylinders.

$\eta_v$ is a function the engine operating environment and speed. $\eta_v$ can be determined from a look-up table based on engine operating conditions. When the controller 26 receives a requested torque command, the controller 26 retrieves $\eta_v$ from the look-up table.

$P_{man}$ is related to an instantaneous mass ($m_{man}$) in the intake manifold 16 based on the ideal gas law. Therefore, the following equation is incorporated:

$$P_{man} = \left(R \cdot \frac{T_{amb}}{V_{man}}\right) \cdot m_{man} \quad (5)$$

wherein:
 $V_{man}$=intake manifold volume.

Equation (5) is inserted into equation (4) to yield the following equation:

$$\dot{m}_v = (\eta_v \cdot V_c \cdot N) \cdot \left(\frac{C}{120}\right) \cdot \left(\frac{m_{man}}{V_{man}}\right) \quad (6)$$

Using equation (6) $m_{man}$ is solved for, differentiated and inserted into equation (3) to provide:

$$\dot{m}_{throttle} = (\dot{m}_v \cdot \tau) + \dot{m}_v \quad (7)$$

where:

$$\tau = \left(\frac{120}{C}\right) \cdot \frac{V_{man}}{\eta_v V_c N};$$

and $\ddot{m}_v$ = acceleration of the mass flow into the cylinders.

Equation (7) is transformed into a Laplace domain to provide the mass flow rate into the intake manifold 16 and the mass flow rate out of the intake manifold 16 according to the following:

$$\dot{m}_v(s) = \frac{\dot{m}_{throttle}(s)}{\tau \cdot s + 1} \quad (8)$$

where:

$\dot{m}m_v(s)$ = Laplace transform of $\dot{m}_v$;

$\dot{m}_{throttle}(s)$ = Laplace transform of $\dot{m}_{throttle}$; and s = Laplace operator.

Equation (8) is inverted to theoretically cancel the intake manifold dynamics. A perfect inversion of equation (8) is not possible, nor is it always desirable. The resulting response would be a substantially instantaneous step in torque output rather than a smooth exponential change. For the simplest implementation of shaping the response and rejecting the noise, a first and second pole ($P_{des}$) and ($P_{noise}$) respectively, are added to the inverted equation (8) to provide a smooth exponential change in torque output. $P_{des}$ and $P_{noise}$ are measured in frequency, or radians per second. $P_{des}$ is utilized to control the rate of response of the engine 12 to the requested torque change. For example, a pole of 10 radians per second will provide a faster response than a pole of 1 radian per second. Since the inversion of equation (8) results in taking the derivative of $\dot{m}_v$, this calculation would over respond to noise from sensors. Thus, $P_{noise}$ is introduced to attenuate the impact of measurement noise from mechanical and electrical sources.

Implementing $P_{des}$ and $P_{noise}$ in inverted equation (8) provides the following final transfer function:

$$\dot{m}_{throttle}(s) = \frac{(\tau \cdot s + 1) \cdot \dot{m}_v(s)}{\left(\frac{s}{P_{des}} + 1\right)\left(\frac{s}{P_{noise}} + 1\right)} \quad (9)$$

$P_{des}$ and $P_{noise}$ are predetermined fixed constants that are based on a desired level of engine performance. For example, when the engine 12 operates in a high performance mode (i.e., fast response), $P_{des}$ has a higher frequency. When the engine 12 operates in a low performance, high efficiency mode (i.e., slower response), $P_{des}$ has a lower frequency. $P_{noise}$ is selected based on the desired noise rejection frequency range. For example, if frequencies above 100 rad/s were to be attenuated, $P_{noise}$ would be selected to be less than 100 rad/s. In an alternate embodiment, $P_{des}$ and $P_{noise}$ are variable and change as the desired operational performance of the engine 12 changes. This equation can be converted into digital form using any standard digital conversion method for implementation in the controller 26.

Figure 2:
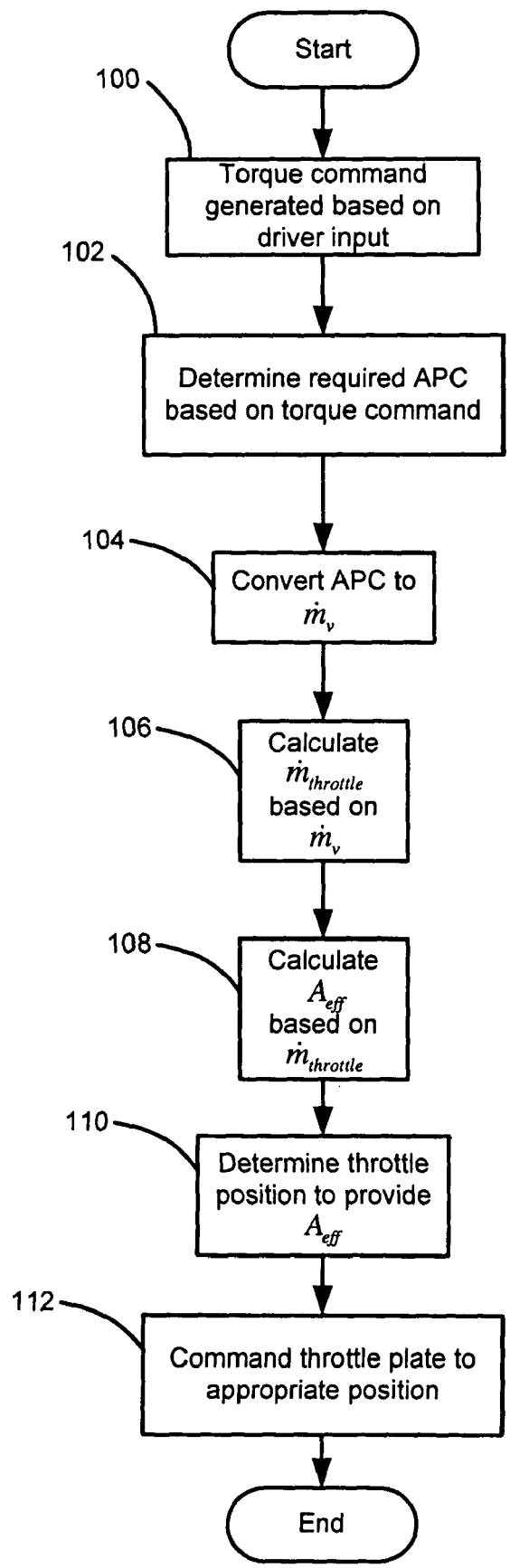
FIG. 2 is a flow chart illustrating a dynamic torque control according to the present invention.

FIG. 2 is a flow chart illustrating the dynamic torque control of the present invention. Initially, in step 100, a torque command is determined from the driver input device 42. The torque command indicates a desired torque output. In step 102, control determines the required APC to deliver the requested torque based on the torque command. In step 104, control implements equation (2) to convert APC to $\dot{m}_v$. Control implements equation (9) in step 106 to determine $\dot{m}_{throttle}$ based on $\dot{m}_v$.

In step 108, control implements equation (1) to determine $A_{eff}$ required to provide $\dot{m}_{throttle}$. Control calculates the angular position of the throttle plate 18 that will provide $A_{eff}$ in step 110. In step 112, control commands the throttle 14 to adjust the angular position of the throttle plate 18 to the desired position. Adjusting the position of the throttle plate 18 enables the proper $\dot{m}_{throttle}$ required to deliver the requested torque output.

The requested torque command continuously changes during operation of the engine 12. The controller 26 continuously commands the throttle 14 to adjust the angular position of the throttle plate 18 based on the dynamic torque command. Thus, the torque control system and method of the present invention, as described above, dynamically control the torque output of the engine 12.

It is also anticipated that the dynamic torque control can be applied generically to other torque producers such as electric motors. By combining equations (1), (2) and (9), the following relationship is provided to determine the actuating variable AEFF for an engine:

$$A_{eff} = \frac{N\sqrt{RT_{amb}}}{P_{amb}\phi}\left(\frac{C}{120}\right)\left[\frac{\tau s + 1}{\left(\frac{s}{P_{des}} + 1\right)\left(\frac{s}{P_{noise}} + 1\right)}\right] \cdot APC \quad (10)$$

Since APC is a function of the commanded torque, equation (10) can be expressed more generally as:

$$A_{eff} = \frac{N\sqrt{RT_{amb}}}{P_{amb}\phi}\left(\frac{C}{120}\right)\left[\frac{\tau s + 1}{\left(\frac{s}{P_{des}} + 1\right)\left(\frac{s}{P_{noise}} + 1\right)}\right] \cdot f(T_{COM}) \quad (11)$$

A further generalization can be made between the $T_{COM}$ and the actuating variable by replacing $A_{eff}$ with a generalized actuator variable, $U_i$, and replacing the parameters specific to an engine with a generalized gain $K_i$. This provides:

$$U_i = K_i(q_1, q_2, \cdots, q_n)\left[\frac{\tau s + 1}{\left(\frac{s}{P_{des}} + 1\right)\left(\frac{s}{P_{noise}} + 1\right)}\right] \cdot T_{COM} \quad (12)$$

where $q_n$ are the generalized variables affecting $K_i$ which in the case of the engine would include, N, R, $T_{amb}$, $P_{amb}$, $\phi$, C, and any parameters affecting the functional relationship $f(T_{COM})$. Note that the subscript, i, is used to denote the link between the generalized actuating variable and the respective generalized gain of the generalized torque source "i".

A new parameter, shaped torque command, $T_{COMSHAPED}$, is introduced and is defined as the product of the dynamics of equation (12) and $T_{COM}$ according to the following:

$$T_{COMSHAPED} = \left[ \frac{\tau s + 1}{\left(\frac{s}{p_{des}} + 1\right)\left(\frac{s}{p_{noise}} + 1\right)} \right] \cdot T_{COM} \quad (13)$$

The time constant, $\tau$, which was defined for an engine in equation (7) is replaced with a generalized time constant $\tau_i$ which is the time constant associated with torque source i for which $U_i$ is the actuating variable.

$$T_{COMSHAPED} = \left[ \frac{\tau_i s + 1}{\left(\frac{s}{p_{des}} + 1\right)\left(\frac{s}{p_{noise}} + 1\right)} \right] \cdot T_{COM} \quad (14)$$

$T_{COMSHAPED}$ is placed into equation (12) to provide:

$$U_i = K_i(q_1, q_2, \ldots q_n) \cdot T_{COMSHAPED} \quad (15)$$

The torque producing device (e.g., engine, electric motor) is controlled based on $U_i$. More specifically, an actuator is adjusted to achieve $U_i$. In the case of an engine, the throttle plate is adjusted. In the case of an electric motor, a voltage regulator is adjusted.

Figure 3:
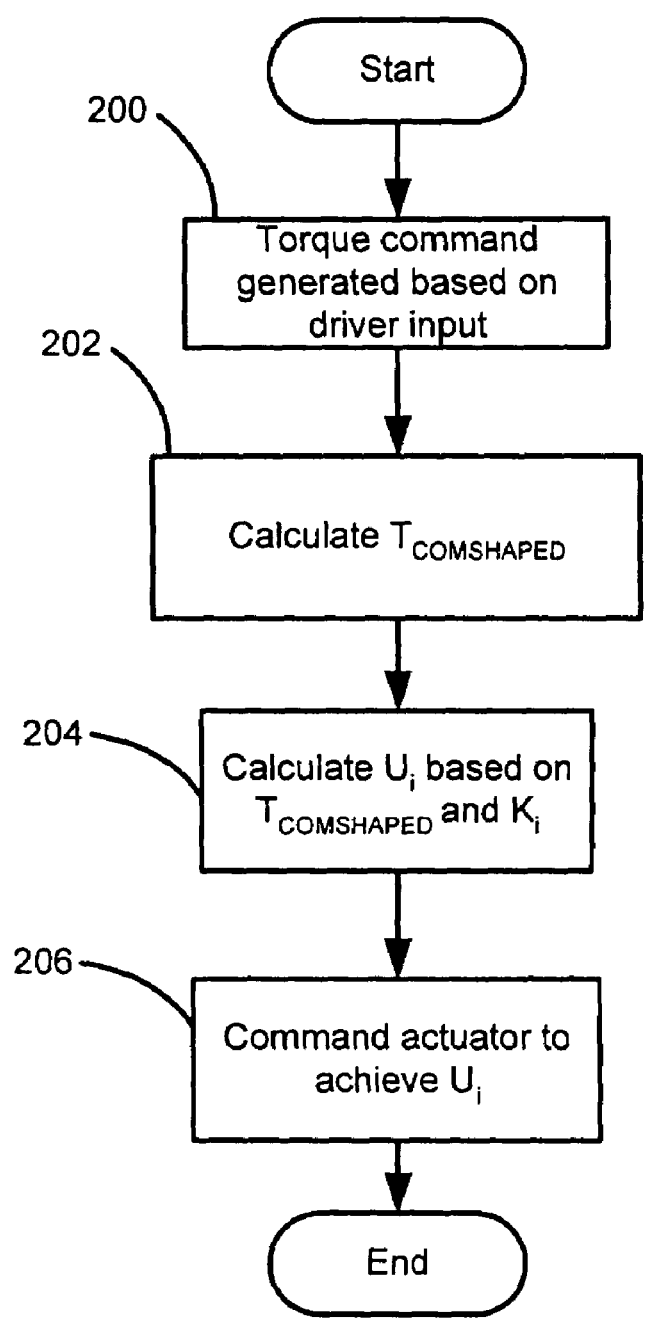
FIG. 3 is a flow chart illustrating a generic dynamic torque control according to the present invention.

Referring now to FIG. 3, a general dynamic torque control is illustrated. In step 200, $T_{COM}$ is generated based on the driver input device 42. In step 202, control calculates $T_{COMSHAPED}$ based on $T_{COM}$. Control calculates $U_i$ based on $T_{COMSHAPED}$ and $K_i$ in step 204 and commands the actuator to achieve Ui in step 206.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. A method of dynamically controlling torque output of a torque producing device, comprising:
   determining a shaped torque command based on a torque command generated by an input device;
   calculating ,an actuator variable based on said shaped torque command and a gain, wherein said actuator variable is calculated by determining a mass airflow into an intake manifold of engine based on an engine shaping filter; and
   regulating an actuator based on said actuator variable to adjust said torque output.

2. The method of claim 1 wherein said shaved torque command is further based on dynamics of said torque producing device.

3. The method of claim 1 wherein said gain is based on parameters affecting the said torque command.

4. The method of claim 1 wherein said torque producing device is an engine, said actuator variable is an effective throttle area.

5. The method of claim 1 wherein said step of determining said mass airflow into said intake manifold includes calculating a desired mass airflow out of said intake manifold based on a desired APC.

6. The method of claim 5 wherein calculating said airflow out of said intake manifold is based on engine speed and a number of cylinders of said engine.

7. The method of claim 5 wherein said desired mass airflow out of said intake manifold is based on intake manifold volume and a number of cylinders of said engine.

8. The method of claim 1 wherein said mass airflow into said intake manifold is further based on an engine noise rejection filter.

9. The method of claim 1 wherein said step of calculating said actuator variable corresponding to said desired APC is based on said mass airflow into said intake manifold.

10. The method of claim 1, wherein said mass airflow into said intake manifold is based on an ambient air pressure and an ambient air temperature.

11. A method of dynamically controlling torque output of an engine, comprising:
    determining a desired air-per-cylinder (APC) based on a torque command;
    calculating an effective throttle area based on said desired APC and an inverted dynamic model of said engine including an engine shaping filter; and
    regulating a throttle to provide said effective throttle area.

12. The method of claim 11 wherein said step of calculating said effective throttle area includes determining a mass airflow into an intake manifold of said engine.

13. The method of claim 12 wherein said step of determining said mass airflow into said intake manifold includes calculating a desired mass airflow out of said intake manifold based on said desired APC.

14. The method of claim 13 wherein calculating said airflow out of said intake manifold is based on engine speed and a number of cylinders of said engine.

15. The method of claim 13 wherein said desired mass airflow out of said intake manifold is based on intake manifold volume and a number of cylinders of said engine.

16. The method of claim 11 wherein said inverted dynamic model further includes an engine noise rejection filter.

17. The method of claim 12 wherein said step of calculating said effective throttle area corresponding to said desired APC is based on said desired mass airflow into said intake manifold.

18. The method of claim 12, wherein said desired mass airflow into said intake manifold is based on an ambient air pressure and an ambient air temperature.

19. A system to dynamically control torque output of an engine, comprising:
    a throttle that regulates airflow into said engine; and
    a controller that determines a desired air-per-cylinder (APC) based on a torque command, that calculates an effective throttle area based on said desired APC and an inverted dynamic model of said engine, including an engine shaping filter, and that regulates a throttle to provide said effective throttle area.

20. The system of claim 19 wherein said controller determines a required mass air flow into an intake manifold based on said requested torque.

21. The system of claim 19 wherein said controller calculates a desired mass airflow out of said intake manifold based on said desired APC.

22. The system of claim 21 wherein said desired mass airflow out of said intake manifold is based on engine speed and a number of cylinders of said engine.

23. The system of claim 21 wherein said controller determines a desired mass airflow into said intake manifold based on said desired mass airflow out of said intake manifold.

24. The system of claim 23 wherein said desired mass flow into said intake manifold is based on intake manifold volume and a number of cylinders of said engine.

25. The system of claim 19 wherein said inverted dynamic model further includes an engine noise rejection filter.

26. The system of claim 23 wherein said controller determines said effective throttle area based on said desired mass airflow into said intake manifold.

27. The system of claim 21 wherein said airflow out of said intake manifold is based on an ambient air pressure and an ambient air temperature.

28. A method of regulating mass airflow through a throttle to dynamically control torque output of an engine, comprising:
 generating a torque command signal;
 determining a desired air-per-cylinder (APC) based on said torque command signal;
 calculating a desired mass airflow out of an intake manifold based on said desired APC;
 determining a desired mass airflow into said intake manifold based on said desired mass airflow out of said intake manifold and an engine shaping filter;
 calculating an effective throttle area based on said desired mass airflow into said intake manifold; and
 regulating said throttle to provide said effective throttle area.

29. The method of claim 28 wherein said desired mass airflow out of said intake manifold is further based on engine speed and a number of cylinders of said engine.

30. The method of claim 28 wherein said desired mass airflow into said intake manifold is further based an engine noise rejection filter.

31. The method of claim 28 wherein said effective throttle area is further based on an ambient air pressure and an ambient temperature.

* * * * *